United States Patent
Haddad et al.

(10) Patent No.: US 8,144,692 B2
(45) Date of Patent: *Mar. 27, 2012

(54) AUTOMATION OF IP PHONE PROVISIONING WITH SELF-SERVICE VOICE APPLICATION

(75) Inventors: Najeeb Farhan Haddad, South San Francisco, CA (US); Laure F. Andrieux, San Jose, CA (US); Michael Edric Tasker, Pleasanton, CA (US); Jawhny Cooke, San Jose, CA (US); Fong Shen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 659 days.

This patent is subject to a terminal disclaimer.

(21) Appl. No.: 11/089,281

(22) Filed: Mar. 23, 2005

(65) Prior Publication Data

US 2005/0180403 A1 Aug. 18, 2005

Related U.S. Application Data

(63) Continuation-in-part of application No. 10/778,516, filed on Feb. 12, 2004.

(51) Int. Cl.
*H04L 12/28* (2006.01)
*H04L 12/56* (2006.01)
*H04J 3/24* (2006.01)
*H04M 1/64* (2006.01)
*H04M 1/24* (2006.01)
*H04M 3/08* (2006.01)
*H04M 3/22* (2006.01)
*H04M 3/42* (2006.01)

(52) U.S. Cl. .............. 370/352; 370/395.3; 370/420; 370/473; 370/474; 379/15.04; 379/88.02; 379/201.03; 379/201.05

(58) Field of Classification Search .............. 370/352, 370/351, 254, 389, 473, 474, 356, 360, 397, 370/395.3, 420, 329, 331; 379/88.02, 88.01
See application file for complete search history.

(56) References Cited

U.S. PATENT DOCUMENTS 5,633,910 A * 5/1997 Cohen ...................... 379/38
(Continued)

FOREIGN PATENT DOCUMENTS
KR    2004010948    * 2/2004

OTHER PUBLICATIONS

Alvin Ang. "IP Telephone". University of Queensland, Dept. of Information Technology and Electrical Engineering. Oct. 18, 2002.*

(Continued)

*Primary Examiner* — Daniel J Ryman
*Assistant Examiner* — Andrew Oh
(74) *Attorney, Agent, or Firm* — Hickman Palermo Truong & Becker LLP (57) ABSTRACT

Approaches for provisioning phones in packet voice networks are disclosed. One approach includes determining that an Internet Protocol (IP) phone has registered in a network; receiving a unique identifier of the IP phone; receiving identifying information about a user to be associated with the IP phone; determining, based on the information provided, a user identifier; generating a configuration for the IP phone based on the user identifier that includes information such as phone number, feature sets, and other configuration parameters; and providing the configuration to the IP phone. Various approaches for determining a user identifier based on information provided by the user are disclosed.

15 Claims, 7 Drawing Sheets

U.S. PATENT DOCUMENTS

| | | | |
|---|---|---|---|
| 5,971,854 A * | 10/1999 | Pearson et al. | 463/41 |
| 6,185,288 B1 * | 2/2001 | Wong | 379/219 |
| 6,243,443 B1 | 6/2001 | Low et al. | |
| 6,385,583 B1 * | 5/2002 | Ladd et al. | 704/270 |
| 6,678,720 B1 * | 1/2004 | Matsumoto et al. | 709/204 |
| 6,691,155 B2 * | 2/2004 | Gottfried | 709/204 |
| 6,744,759 B1 | 6/2004 | Sidhu et al. | |
| 6,757,363 B1 * | 6/2004 | Platt et al. | 379/88.11 |
| 6,791,970 B1 * | 9/2004 | Ng et al. | 370/352 |
| 6,845,499 B2 * | 1/2005 | Srivastava et al. | 717/100 |
| 6,856,616 B1 | 2/2005 | Schuster et al. | |
| 6,958,992 B2 * | 10/2005 | Lee et al. | 370/352 |
| 6,999,458 B2 * | 2/2006 | Fowler | 370/395.31 |
| 7,023,989 B1 * | 4/2006 | Turner et al. | 709/220 |
| 7,031,288 B2 | 4/2006 | Ogier | |
| 7,278,028 B1 * | 10/2007 | Hingoranee | 713/186 |
| 2001/0037394 A1 * | 11/2001 | Yoshimura et al. | 709/228 |
| 2002/0064149 A1 * | 5/2002 | Elliott et al. | 370/352 |
| 2002/0131402 A1 | 9/2002 | Lee et al. | |
| 2002/0150083 A1 * | 10/2002 | Fangman et al. | 370/352 |
| 2003/0055912 A1 * | 3/2003 | Martin et al. | 709/218 |
| 2003/0108172 A1 * | 6/2003 | Petty et al. | 379/142.08 |
| 2003/0135595 A1 * | 7/2003 | Segelstein | 709/223 |
| 2003/0137991 A1 * | 7/2003 | Doshi et al. | 370/466 |
| 2003/0217122 A1 | 11/2003 | Roese et al. | |
| 2003/0223403 A1 * | 12/2003 | Higgins | 370/352 |
| 2004/0058710 A1 * | 3/2004 | Timmins et al. | 455/560 |
| 2004/0121813 A1 * | 6/2004 | Colson et al. | 455/563 |
| 2004/0156490 A1 * | 8/2004 | Adams et al. | 379/126 |
| 2004/0180646 A1 * | 9/2004 | Donley et al. | 455/411 |
| 2004/0260795 A1 * | 12/2004 | Gentle et al. | 709/222 |
| 2004/0264665 A1 * | 12/2004 | Idoni et al. | 379/201.01 |
| 2005/0008136 A1 * | 1/2005 | Dobner et al. | 379/211.02 |
| 2005/0036663 A1 * | 2/2005 | Caspi et al. | 382/124 |
| 2005/0198218 A1 * | 9/2005 | Tasker et al. | 709/220 |
| 2006/0013195 A1 * | 1/2006 | Son et al. | 370/352 |
| 2006/0258344 A1 * | 11/2006 | Chen | 455/419 |
| 2009/0154681 A1 | 6/2009 | Kung et al. | |

OTHER PUBLICATIONS

First Office Action, Chinese Patent Application No. 200580004362.7, dated Sep. 25, 2009, (8 pages) with English translation thereto (4 pages).

Current Claims for CN OA Application No. 200580004362.7, (4 pages).

U.S. Appl. No. 10/778,516, filed Feb. 12, 2004, Supplemental Notice of Allowance, Jan. 22, 2010.

Canadian Office Action for foreign patent application No. 2555567 dated Jan. 7, 2010.

Current Claims in CA foreign patent application No. 2555567.

$2^{nd}$ Office Action from CN for foreign patent application 200550004362.7 dated Jul. 20, 2010.

Current claims in CN for foreign patent application 200550004362.7.

CA Office Action for CA application serial No. 2555567, dated Aug. 26, 2010, (10 pgs).

Current claims for CA application serial No. 2555567.

Office Action from CN for foreign patent application No. 200580004362.7 dated Sep. 21, 2011.

Current claims in CN for foreign patent application No. 200580004362.7, dated Sep. 2011, 3 pages.

* cited by examiner

AUTOMATION OF IP PHONE PROVISIONING WITH SELF-SERVICE VOICE APPLICATION

CROSS-REFERENCE TO RELATED APPLICATIONS; PRIORITY CLAIM

This application is related to and claims domestic priority under 35 U.S.C. §120 as a Continuation-in-part of prior application Ser. No. 10/778,516, filed Feb. 12, 2004, "Automated Provisioning of Phones in Packet Voice Networks," of Michael Tasker et al., the entire contents of which are hereby incorporated by reference as if fully set forth herein.

FIELD OF THE INVENTION

The present invention generally relates to computer networks. The invention more specifically relates to problems involved in provisioning phones that are used in packet voice networks.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Network service providers or customers who use packet voice telephony or voice-over-IP (VoIP) services face challenges in deploying IP phones to end-users. In particular, service providers and customers need to provide an IP phone with a configuration appropriate or correct for each individual user and including a variety of parameters, such as phone numbers and particular feature sets for each phone. For example, an IP phone that is deployed at a reception desk requires an entirely different feature set and configuration than a phone deployed to a conference room. Different individuals also require different phone numbers and/or feature sets depending on the roles of the individuals in an organization or the service package to which the end user subscribes.

In a conventional approach, the process of deploying IP phones has been mostly manual. This approach has required a technician to be physically on site to distribute the phones to each location and to create the correct configuration for each phone. This approach is costly and time-consuming. The approach also is especially challenging when migrating an existing customer (or site) to a VoIP network while preserving the customer's existing phone numbers.

Call control systems are used to manage IP phones in VoIP networks. Commercial examples of call control systems include Cisco Call Manager and Call Manager Express on Cisco IOS® routers, commercially available from Cisco Systems, Inc., San Jose, Calif. A call control system identifies a phone by its Media Access Control (MAC) address, which is an identifier value that is assigned when the phone is manufactured and which is typically never changed. Dynamic IP addressing is typically used in VoIP networks, and call control systems typically include or can access a Dynamic Host Control Protocol (DHCP) server for assigning IP addresses.

In this context, when an IP phone boots up, the IP phone obtains an IP address for itself by sending a DHCP request that contains its MAC address to the call control system. The IP phone also requests an initial configuration from the call control system. Upon receiving the initial configuration, the IP phone internally applies the configuration. The IP phone registers with call control with its MAC address and other parameters.

However, the initial configuration typically does not contain all parameter values that are customized or appropriate for a particular individual user. For the IP phone to function properly for a particular user, the correct specific configuration for the IP phone needs to be stored in the call control system in advance, and retrieved and applied to the IP phone. There may be one specific configuration for each MAC address that identifies an IP phone. Therefore, selecting and applying the right configuration requires a way to associate a particular IP phone, as identified by its MAC address, with a particular user. If an individual user can be associated with an individual IP phone, then the right phone numbers and feature sets can be assigned, proper configurations can be built, and each phone can be properly provisioned.

In current practice, identifying a phone to user association generally is a manual process. For instance, a service provider sends a technician on site to physically distribute the phones to each location, and that technician determines associations of MAC addresses to users. This information is sent to the network operations center of the service provider, and proper configurations for each phone are manually generated and electronically provisioned in the call control system at the site through network communication. Associations of users to MAC addresses, phone numbers, feature sets, etc. are established. However, this approach is considered too costly and undesirable because it requires an on-site visit.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An approach for automated provisioning of IP phones in packet voice networks is described in co-pending application Ser. No. 10/778,516, filed Feb. 12, 2004, "Automated Provisioning of Phones in Packet Voice Networks," of Michael Tasker et al, hereinafter the "Automated Provisioning application", the contents of which have been incorporated by reference. As disclosed in the Automated Provisioning application, phone to user associations are determined automatically, and IP phones are provisioned automatically to facilitate large-scale deployment of IP phones.

While the techniques described in the Automated Provisioning application can be used to automatically discover phone MAC address and user identity associations in most situations, there are certain situations in which the MAC address to user identity association cannot be automatically determined. In addition, in certain situations it may not be appropriate or desirable to use techniques that automatically discover phone MAC address and user identity associations. In these cases, alternative techniques of determining phone MAC address and user identity associations are needed to provision the phone.

The techniques disclosed herein allow end-users to provide all the information needed for the provisioning system to identify user and phone association. No manual involvement by the system administrator or service provider operator is needed using the disclosed techniques. Once an end-user provides identification information to the provisioning system, the user identity-phone association can be determined, and the IP phone can be automatically provisioned.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Automated Provisioning of Phones in Packet Voice Networks
   3.1 Automatically Determining an Association of Phone Identifier to User Identifier
   3.2 User Identifier Information Provided By User
   3.3 Automatically Provisioning Phone Based on User Identifier
   3.4 Deployment in a Cisco Network
4.0 Implementation Mechanisms-Hardware Overview
5.0 Extensions and Alternatives 1.0 General Overview The needs identified in the foregoing background, and other needs and objects that will become apparent for the following description, are achieved in the present invention, which comprises, approaches for provisioning phones in packet voice networks. One approach comprises determining that an Internet Protocol (IP) phone has registered in a network; receiving a unique identifier of the IP phone; determining, based on information provided by an individual user associated with the IP phone, a user identifier of the user associated with the IP phone; generating a configuration for the IP phone based on the user identifier; and providing the configuration to the IP phone. Various approaches for determining a user identifier based on information supplied by the user associated with the IP phone are disclosed.

Another approach for determining a phone number to be assigned to an Internet Phone (IP) comprises determining that an IP phone has registered in a network; assigning a unique temporary phone number to the IP phone; receiving a media access control (MAC) address of the IP phone; receiving user identifier information from a user using the IP phone through a voice response system; retrieving, from a database of user information, a user record based on the user identifier information; and obtaining a user phone number from the user record.

The disclosure provides many other aspects and features of the foregoing aspects. In particular, in other aspects, the invention encompasses a computer apparatus and a computer-readable medium configured to carry out the foregoing steps.

2.0 Structural and Functional Overview

Figure 1A:
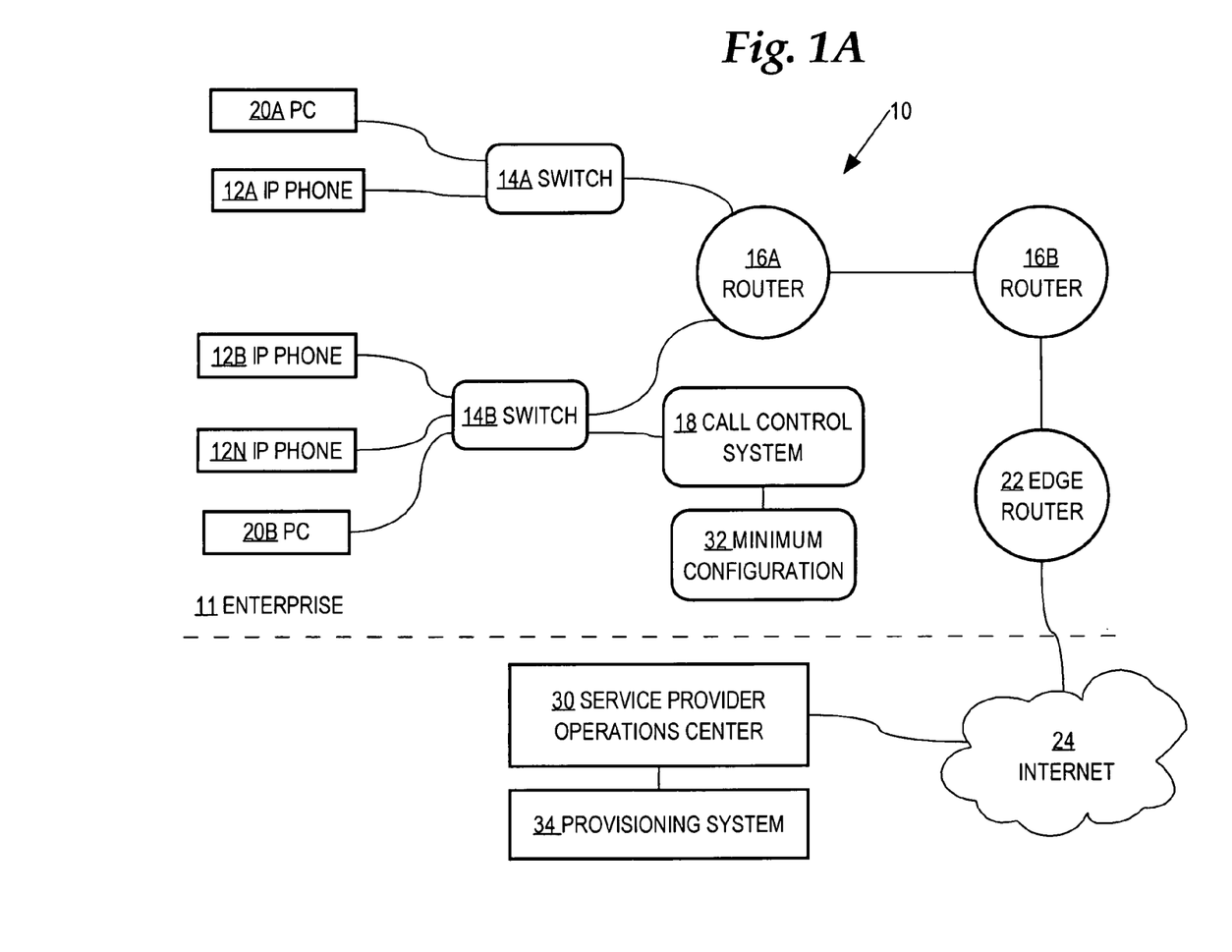
FIG. 1A is a simplified network topology diagram showing elements in an example packet voice network.
Figure 1B:
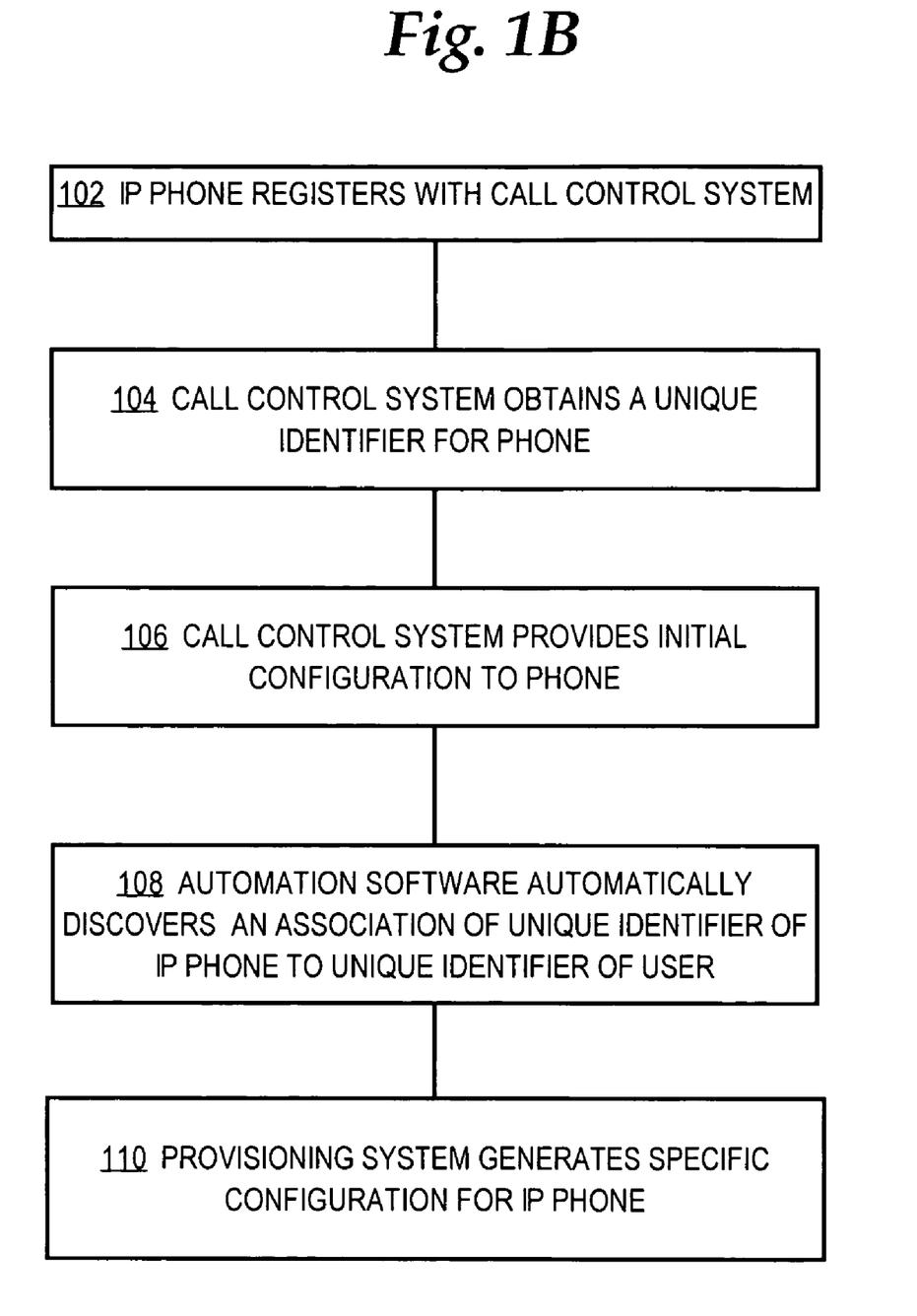
FIG. 1B is a flow diagram showing a high-level view of one approach for automated provisioning of phones in packet voice networks.

FIG. 1A is a simplified network topology diagram showing elements in an example packet voice network. FIG. 1B is a flow diagram showing a high-level view of one approach for automated provisioning of phones in packet voice networks.

Referring first to FIG. 1A, a packet voice network 10 associated with a business enterprise 11 comprises a plurality of IP phones 12A, 12B, 12N, etc. that are communicatively coupled to ports of one of a plurality of switches 14A, 14B. The switches are coupled to routers 16A, 16B. A call control system 18 is coupled to one of the switches 14A, 14B, or implemented as an application hosted by one of the routers 16A, 16B. In this arrangement, a particular phone 12A is coupled indirectly to the call control system 18 and can register with the call control system.

One or more personal computers 20A, 20B also may be coupled to ports of switches 14A, 14B. In some deployments a particular personal computer may be coupled to the same port of a switch as an IP phone. For example, PC 20A may be coupled to the same port 21 of switch 14A as IP phone 12A. As described further herein, determining whether the MAC address of a device is associated with an IP phone or PC on a particular port may be derived from sources other than information maintained by the switch, such as the phone registration table from Call Control, the Cisco Discovery Protocol (CDP) neighbor table, where a device type is included.

Network 10 may be coupled to another network such as internet 24 through an edge router and a firewall or other appropriate security control mechanisms. In this arrangement a service provider operation center 30 located outside network 10 and enterprise 11 may communicate with call control system 18 through the internet 24. In the example of FIG. 1A the enterprise 11 may be considered a customer of the service provider. Although the term "service provider" is used in certain descriptions herein, all of the techniques described herein are equally applicable to business enterprises that are deploying packet voice networks independently of a service provider. Thus, the descriptions of the service provider and its interactions with other parties and elements are provided as an example deployment scenario, but the techniques described herein are applicable to an enterprise deployment scenario and others.

Referring now to FIG. 1B, in step 102, an IP phone automatically registers with a call control system. In step 104, the call control system obtains a unique identifier associated with the IP phone. In one embodiment, the unique identifier is a MAC address. In step 106, the call control system provides an initial configuration to the IP phone.

In one embodiment, call control system 18 comprises one or more computer programs or other software elements implementing a feature or application that allows phones 12A, 12B, 12N to auto-register with the call control system, and to allow the call control system 18 to discover MAC addresses of the phones. In one embodiment, call control system 18 is coupled to switch 14B and comprises Cisco Call Manager, and in another embodiment call control system 18 is Cisco Call Manager Express in a Cisco IOS® router. The call control system 18 provides the IP phone with a generic minimum configuration 32 that is generated by the call control system based on a template stored in or accessible to the call control system. The minimum configuration 32 includes a phone number that is selected from a pool of available numbers. The pool of available numbers may include private or temporary numbers.

In the embodiment shown in FIG. 1B, in step 108, automation software in a provisioning system automatically discovers, for each IP phone, an association of a unique identifier of the IP phone to a user identifier of an individual user. In one embodiment, operations center 30 includes a provisioning system 34 that auto-discovers associations of phone MAC addresses to users once phones are registered with the minimum configuration. Alternatively, the provisioning system 34 may be implemented as an element of network 10, for example, as part of call control system 18. In one embodiment, the provisioning system 34 is hosted on the same server as the call control system 18.

However, automatic techniques for discovery of an association of an identifier of an IP phone to user identifier may not be available or desirable in all situations. Techniques that allow a user to provide user identifier information which can be used to determine a user identifier-IP phone association without the assistance of an on-site technician are discussed separately below.

Returning to the embodiment of FIG. 1B, in step 110, the provisioning system generates a specific configuration for each phone. In one embodiment, provisioning system 34 generates an IP phone configuration that includes the correct phone number, feature set, and other configuration parameters based on the particular user associated with the phone. The provisioning system then provides the specific configuration to the call control system. For example, provisioning system 34 may communicate a specific configuration to call control system 18 through internet 24. As a result, the call control system 18 can provide the specific configuration to a phone in network 10, and the phone applies and begins using the specific configuration.

Figure 1C:
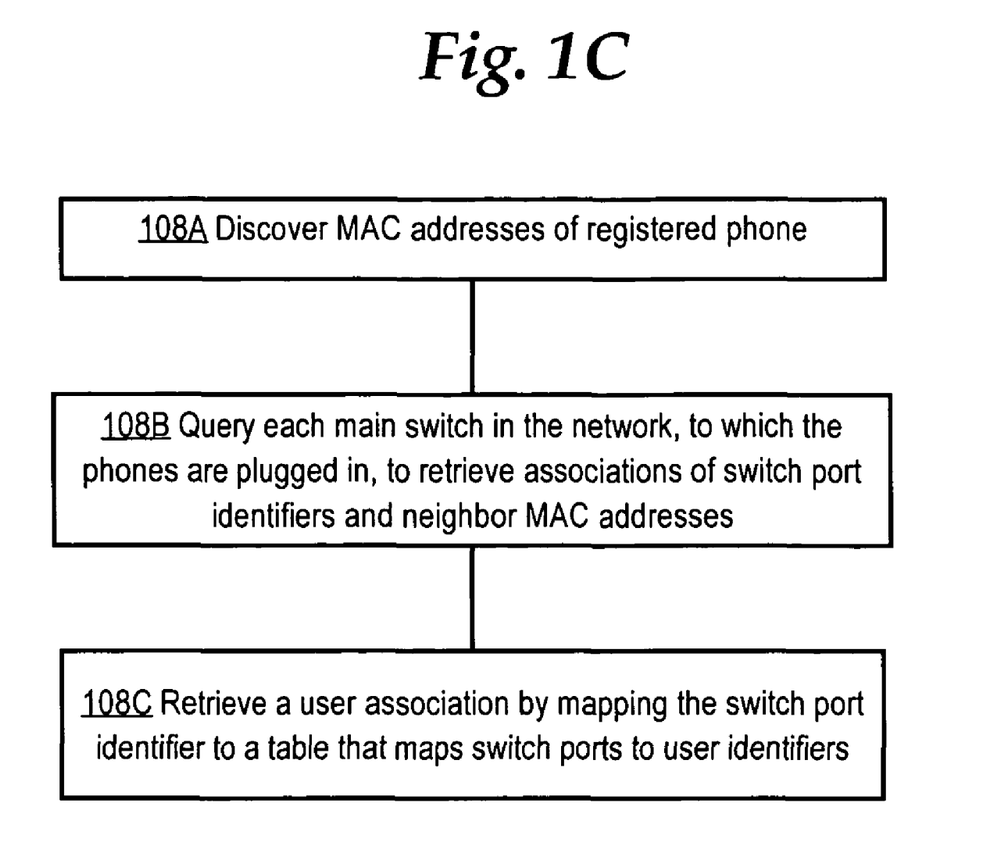
FIG. 1C is a flow diagram of additional steps that may be performed in an implementation of step 108 of FIG. 1B.

FIG. 1C is a flow diagram of additional steps that may be performed in an implementation of step 108 of FIG. 1B. Generally, step 108 involves determining a phone MAC address to user association. In one embodiment, step 108 may involve combining information as shown in FIG. 1C. In step 108A, MAC addresses of registered phones are discovered. In step 108B, a query is issued to each main switch in the network, to which the phones are plugged in, to retrieve associations of switch port identifiers and neighbor MAC addresses. In this context, a neighbor MAC address as maintained by a switch is a MAC address of the device that is coupled to the associated port.

In step 108C, a user association is retrieved by mapping the switch port identifier obtained in step 108B to a table that maps switch ports to user identifiers. It is assumed that each customer maintains information in an inventory tracking system that allows the customer to identify the switch port to user association. Optionally, the inventory tracking system also may provide information about optionally connected devices, locations, etc. Each user may be assigned more than one switch port. If such inventory data is not available, a site survey may be done to provide such information.

3.0 Automated Provisioning of Phones in Packet Voice Networks 3.1 Automatically Determining an Association of Phone Identifier to User Identifier One specific embodiment of an approach for automated provisioning of phones in packet voice networks is now described with reference to FIG. 2A and FIG. 2B. These figures illustrate a flow diagram of an example embodiment of an approach for provisioning of phones in a packet voice network that uses automated techniques, and additionally allows a user to provide user identification information if the automated techniques fail. Other embodiments do not use any fully automated techniques, and instead always require the user to provide user identification information using inventive techniques of the present invention, are also possible. These embodiments will be discussed further below.

In the following description, the term "phone" typically refers to an IP phone. However, any phone with a switch port, such as an Ethernet or USB port, and a display, may be used. A commercial example of an IP phone is the Cisco 7920 IP phone, although any kind of IP phone may be used.

Figure 2A:
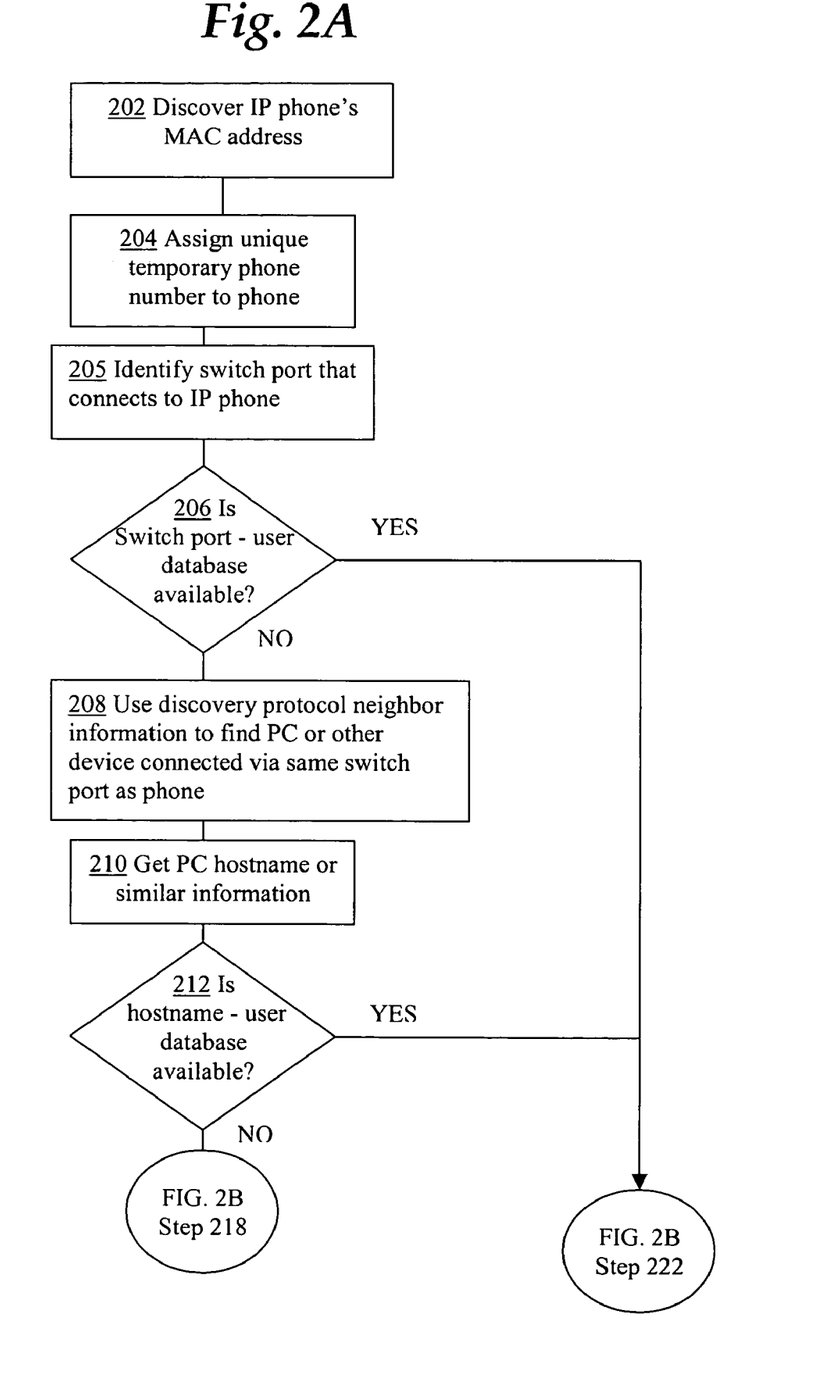
FIG. 2A is a flow diagram of an example embodiment of an approach for automated provisioning of phones in a packet voice network.
Figure 2B:
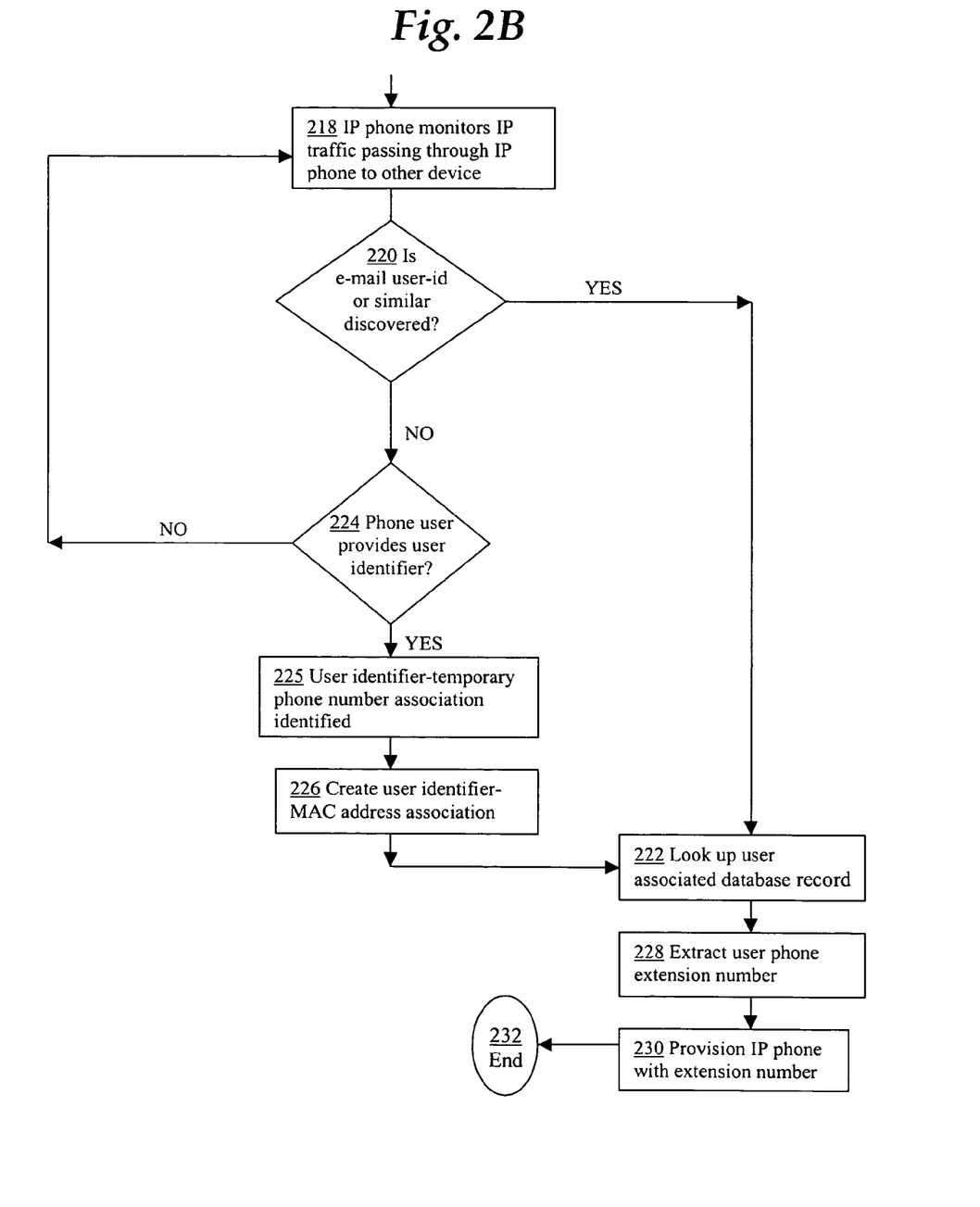
FIG. 2B is a flow diagram of further steps in the approach of FIG. 2A.

The description herein of FIGS. 2A and 2B assumes that certain preliminary steps have occurred in the deployment of IP phones. For example, this description assumes that a service provider or customer orders IP phones from a manufacturing organization, which ships the phones directly to the customer site; that is, there is no requirement for a "staging area" or other pre-configuration point at which the IP phones are configured after manufacture but before deployment to the end user site or customer. The service provider also configures the call control system with a minimum configuration for each type of phone or for several types of phones, and a pool of phone numbers to be assigned. The pool comprises temporary numbers that may not correspond to the final numbers that are assigned to the phones on a generally permanent basis.

The description also assumes that the customer opens the shipping box for the phones, distributes the phones to locations in the organization. For example, phones are distributed to employee desks, and each person receives the appropriate type of phone based on a label on the outside of the box. Each person plugs the phone in to a switch port that is typically accessible through a jack at the location of use. The phone then boots up. The IP phone registers with a call control system and provides its MAC address. In response, the call control system provides a minimum configuration with a randomly assigned phone number.

Further, the description herein specifies actions with respect to one IP phone; however, in a commercial embodiment the techniques herein may be applied to any number of IP phones that register and initiate operation relatively concurrently.

Referring now to FIG. 2A, in step 202, the MAC address of the phone is discovered. In one embodiment, such discovery involves listening to a phone registration event published by the call control system, or issuing a query to the call control system for all registered phones. The event or a reply to the query provides a MAC address and a temporary phone number associated with the phone. This approach assumes that the IP phone registers with the call control system and presents, at the time that the phone boots up or registers, a device name that includes the ethernet MAC address. The call control system may maintain a table associating MAC addresses to phone numbers and can generate an event with such information or provide it in a reply to the query.

There is a risk that an unauthorized IP phone could enter the network, register with the call control system, automatically configure itself as described further herein, and begin placing unauthorized calls through the network, e.g., without the user paying for call service. Therefore, optionally, after step 202 is performed, a service provider may require human intervention, or alternatively automatic intervention, for the purpose of enforcing security. For example, to increase security, after step 202 the service provider could require an administrator to review the identity of the IP phone and approve it for subsequent processing as described below for steps 204-232. In one embodiment, each time that an IP phone registration event is detected in step 202, the MAC address of the phone and other information from the registration event is stored in a record in a review queue. The process of FIG. 2A is then interrupted until an administrator reviews the record and marks the record as approved. When the record is marked as approved, then control proceeds to step 204.

Alternatively, an authentication system can automatically interrupt the process and verify the registration, thereby eliminating the need for manual administrator intervention. For example, an automated check against a secure list of MAC addresses and/or User IDs may provide sufficient security in some situations. In addition, a log can be kept for later manual review by a human and/or automated review by a software component.

In step 204 a unique temporary phone number is assigned to the phone. The phone number may be selected from a pool of available temporary numbers.

In step 205, a switch port that connects to the phone is identified. In various embodiments, the switch port that connects to the phone may be determined by establishing a remote connection to the switch and issuing an appropriate query; issuing a DHCP request that encapsulates a request for the switch port under DHCP option 82; interrogating a router ARP table or switch CAM table; and interrogating a discovery protocol table in the switch if supported by the switch.

For example, for Cisco Catalyst® Ethernet switches and IP phones, CDP can be enabled to obtain this information. A provisioning system can query the CDP table of the switch, using a Simple Network Management Protocol (SNMP) query directed to the Cisco-CDP Management Information Base (CDP-MIB) to obtain neighboring device information. The cdpCacheTable of Cisco-CDP-MIB gives information about the type of connected device (e.g., router, switch, IP phone), device IP address, device hashKey, and MAC address.

Alternatively, a Layer 2 switch normally maintains a Bridge Forwarding Table (CAM Table) that associates neighbor MAC addresses to port identifiers. In one embodiment, these values may be obtained from the dot1dBasePortIfIndex, dot1dTpFdbTable in the BRIDGE-MIB. Further, for a router or a switch supporting Layer 3 routing, the ARP table of the switch or router contains neighboring device information, including device IP address, MAC address, and connected interface.

Based on any of the foregoing information sources, an association of a phone MAC address to a switch port may be determined by matching the MAC address of a registered phone with a table associating a switch port value and neighbor MAC address that has been obtained from the switch.

Thereafter, an association of the phone MAC address to a user identifier is derived as shown by steps 206 to 228. In step 206, a test is performed to determine if a database or table associating switch port values to user identifier values is available. If so, then a user identifier for the phone can be determined by looking up the port value for the port to which the phone is attached in the database or table; then control is transferred to step 222 of FIG. 2B.

If such a database or table is not available, or when a user plugs the phone into a different pre-assigned LAN switch port, then indirect means may be used to derive a user identifier, as shown by step 208, step 210, and step 212. In step 208, CDP neighbor information is used to identify a personal computer or other device that is connected to the same switch port as the phone. In step 210, a PC hostname or similar information is retrieved. In step 212, a test is performed to determine whether a database or table that associates hostnames to user identifiers is available. If so, then a user identifier for the phone can be determined by looking up the hostname in the database or table; then control is transferred to step 222 of FIG. 2B.

These steps recognize that a phone to switch port association can be determined based on information about devices other than phones that have a known association to a specific user or location. For example, if a user of an IP phone also has a personal computer (PC), and a customer tracking system maintains information associating an identifier of the PC to a switch port and to a user or location, such information can be used to associate a user to a phone.

As a specific example, in many deployments when a user receives an IP phone, both the phone and PC use the same switch port. The phone can be plugged into the switch port, and the PC is plugged into the switch port built behind the phone. A user identifier can be determined based on interrogating the switch, which sees the MAC address of the PC on the same port as the MAC address of the phone. Some customers may adopt port assignment schemes such as alternating the port number for the IP phone and PC that are deployed at the same location. Therefore, if the customer inventory system already maintains information associating a PC, switch port, and user, then applying an adjacency rule to that information enables deriving an association of the IP phone MAC address, switch port, and user. An example of an adjacency rule is that if a MAC address for an IP phone appears on a switch port having an identifier that is one greater than the port on which the MAC address for a PC appears, then the IP phone is associated with the same user as the PC.

In one embodiment, a message may be displayed on a display of the IP phone requesting the user to contact an administrator. However, as discussed herein, alternative techniques for obtaining a user identifier that do not require the direct assistance of an administrator may be used.

Until such time as the user contacts an administrator or provides a user identifier, the process attempts to use other automated means to identify the user. For example, as shown in step 218 of FIG. 2B, in one embodiment the IP phone monitors IP network packets or traffic passing through the IP phone and directed to the PC that is on the same switch port. For example, the IP phone monitors traffic passing through the IP phone to the PC and inspects packets of the traffic to determine if the packets identify well known mail protocols, such as POP3 email access, to discover the email address of the PC user. This step recognizes, for example, that in many deployments a PC is set up to periodically poll its POP3 mail server and retrieve email every few minutes.

In step 220, a test is performed to determine if an email userid or similar identifier is discovered in the traffic through the IP phone. If so, then the email userid is assumed to identify the user of the IP phone, and control passes to step 222.

When step 222 is reached, a user identifier has been determined through one of the preceding methods. Therefore, at step 222, information about the user of the IP phone is retrieved from a database record based on the user identifier. The user information is assumed to include a persistent or permanent user phone number, which is extracted at step 228. In step 230, the IP phone is provisioned with the persistent number.

A user may provide user identifier information without the assistance of an administrator or technician at step 224. For example, a user may call an Interactive Voice Response (IVR) system to enter user identifier information. In the embodiment shown in FIG. 2B, as long as the user does not provide user identifier information, the process continues to monitor traffic through the phone in attempt to identify the user through loop 218-220-224. Alternatively, if the user has called an administrator, then a system administrator may manually determine a persistent phone number for the IP phone and provide it to the call control system.

If the user identifier is discovered by monitoring email traffic, control then passes to step 222, in which information about the user of the IP phone is retrieved from a database record based on the user identifier. The user information is assumed to include a persistent or permanent user phone number, which is extracted at step 228. In step 230, the IP phone is provisioned with the persistent number.

The process of FIG. 2A-2B ends at step 232.

3.2 User Identifier Information Provided by the User

Fully automated techniques, such as those described with respect to FIG. 2A, require static assigning of a certain physical LAN switch port to the user, or require a PC to be connected to the IP phone. IP mobility cannot be supported using these techniques when service providers want to allow the user to be able to configure their phone initially from any location, such as from their home or remote office, for example. In addition, in the embodiment shown in FIG. 2A-2B, when the User Identifier cannot be automatically discovered or determined, the user of the IP phone is given the option of providing user identifier information at step 224. Therefore, in alternative embodiments, a user is required or given the option of entering user identifier information using the inventive techniques of the present invention.

Typically, techniques for a user to provide user identifier information ensure that the user who has the IP phone provides a trustworthy user identifier. Examples of specific techniques that can be used to prompt the user to provide user identifier information, and for the user to provide the information, are provided herein.

In one embodiment, an interactive voice response (IVR) system may be used to obtain user identifier information and to support configuration of IP phones. In one example implementation, an enterprise that is deploying IP phones may create a list of each employee or other user who is receiving a phone. The list includes an e-mail address of the employee or user. A service provider or enterprise then uses an automatic facility to generate and send an e-mail message to each employee or user. The e-mail may include a pseudo-randomly selected user identifier and password. Alternatively, the e-mail may instruct the user to use a known identifier and/or password, such as employee number.

The e-mail may instruct the user to call a specified IVR system number from the newly deployed IP phone (or any other phone) once the new phone has been installed. Alternatively, or in addition, each newly deployed IP phone may display a text message prompting the user to call the specified IVR system number from that phone or any other phone. As another alternative, each newly deployed phone may have a sticker attached that prompts the user to call the specified IVR system. As another example, a voice mail may be sent to each phone instructing the user to call the IVR system. Alternatively, the call control system may initially direct any number dialed by the user (except emergency numbers) to the IVR system. If a system is configured to utilize user identifier information already known to the user, such as employee number, for example, a display on the phone may provide sufficient prompting for a user to initiate the process of providing user identifier information without any e-mail being sent to users. Any technique for prompting a user to call the IVR system, and for ensuring that the user knows of appropriate user identifier information to provide to the IVR system, may be used.

When the user calls the IVR system, the IVR may use a calling line identification function ("Caller ID") to determine and collect the calling number, which is the randomly generated phone number that was assigned at step 205. The IVR prompts the user to enter the user identifier and password from the e-mail. Alternatively, the IVR may prompt the user to enter a user identifier already known to the user. For example, the IVR may prompt the user to enter employee number, telephone extension number, or social security number.

The IVR system collects user identifier information from the user and authenticates the information. The user identifier information may include a user identifier and optional password. If an e-mail was used to provide user identifier information to the user, the IVR system will verify that a valid user identifier generated for the e-mail has been entered. If the e-mail also provided a password, or instructed the user as to a password to use, the IVR system will also verify that the correct user identifier and password combination was provided by the user. However, a password is not required. For example, in certain embodiments, use of a user identifier that should only be known by the user, such as his social security number, may be considered sufficiently secure to allow automatic provisioning of the phone. Typically, the customer ordering the IP phones can specify what user identifier information is needed to operate the IVR system and effect provisioning of the IP phones.

While the process has been described using an IVR system as an example technique for obtaining user identifier information, there are alternative techniques for identifying the person using an IP phone. For example, instead of a voice response system, the display on the phone could be programmed to display a question-and-answer session that prompts the user to respond with menu choices that identify and authenticate the user, or to read user identification and password information entered by the user. Such a display program could be implemented using XML over HTTP, for example. Alternatively, a PC or other computing device running a web browser connected to the phone can be used to enter user identifier information. The PC or other device may be connected via Ethernet, USB, or through IR (infrared) technology, for example. For example, a web interface can be provided for a user to enter user identification information. A user can logon to the web site through a PC running a web browser connected to the phone, or other device providing access to the web site. The web site authenticates the user, collects a temporary phone to user ID association, and sends the information to the provisioning system. Alternatively, the provisioning system itself could offer such a web interface.

As another example, a thumbprint reader on the handset of the phone could be used in conjunction with a thumbprint database to identify and authenticate a person holding the phone. Alternatively, a voice recognition system could be used to identify and authenticate the person who speaks into the phone. In one embodiment, the IVR system includes a voice recognition component, and is capable of identifying a user's voice. Another technique is for a user to be provided with a unique phone number, such as by email or in a user's guide, for example. The user dials the number and the call control process passes it to the provisioning and authentication systems to identify and authenticate the user.

After receiving, and if necessary, authenticating the user identifier information, a user identifier-temporary phone number association is determined at step 225. The user identifier-temporary phone number association of step 225 is used with the MAC address determined in step 202 and temporary number assigned at step 204 to determine a user identifier-MAC address association at step 226. At step 222, information about the user of the IP phone is retrieved from a database based on the user identifier. A persistent or permanent phone number for the user is extracted at step 228. In step 230, the IP phone is provisioned with the persistent phone number determined at step 228.

This process reduces the number of manual steps that an administrator or operator is required to complete deployment and configuration of a new IP phone. Even though the user identifier is not completely automatically determined, use of any process to reduce the cost of installation is beneficial.

3.3 Automatically Provisioning Phone Based on User Identifier

Figure 3:
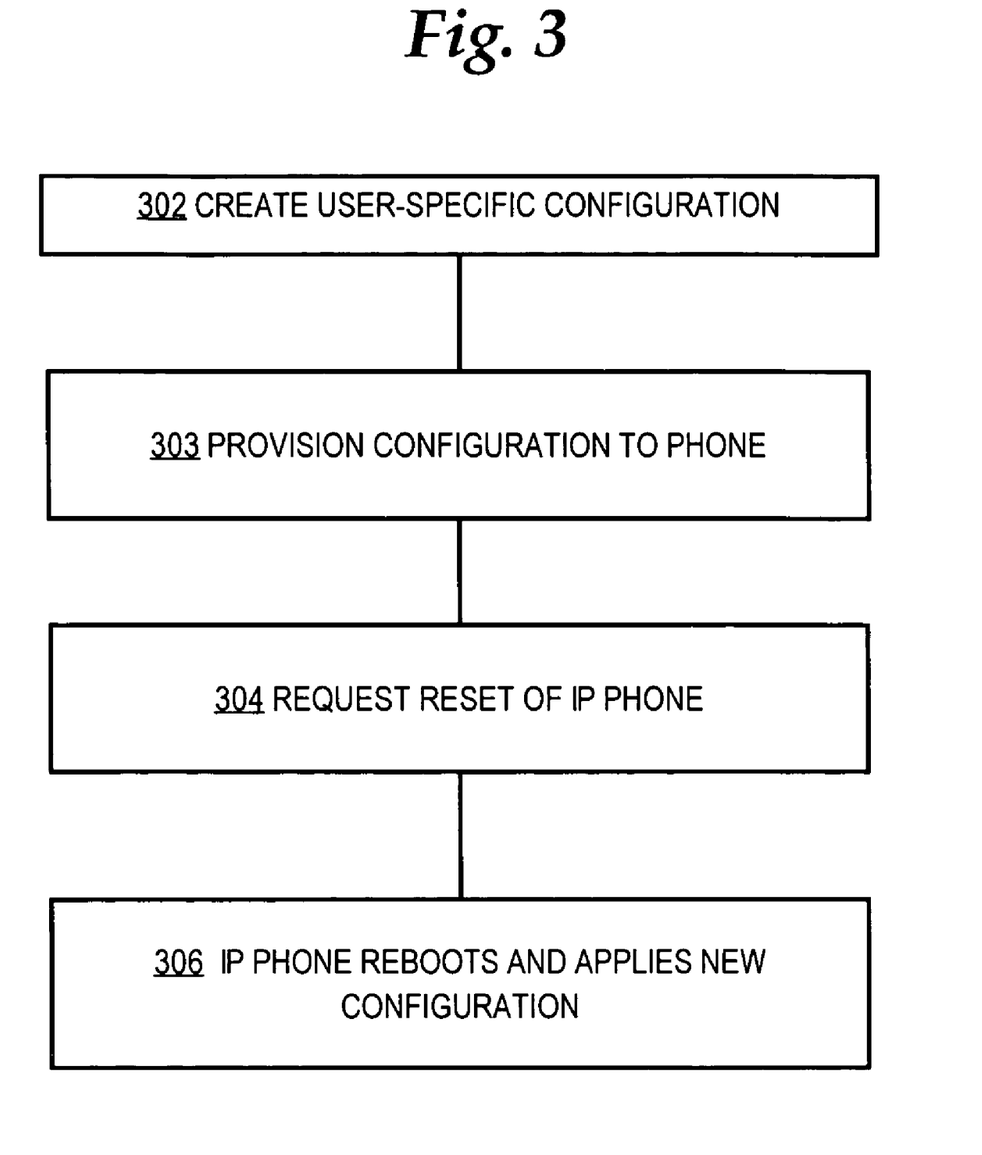
FIG. 3 is a flow diagram of a process for provisioning a phone with a specific configuration.

FIG. 3 is a flow diagram of a process for provisioning a phone with a specific configuration. The steps of FIG. 3 may be performed as part of step 230 of FIG. 2B after determining a user identifier and temporary phone number. In step 302, a provisioning system associated with the call control system creates a user-specific persistent configuration for the IP phone, based on the association of a MAC address, switch port, and user that has been created using the foregoing process. The persistent configuration can include the correct persistent phone number and feature set. In step 303, the persistent configuration is provided to the IP phone. For example, the call control system can provision the new configuration to each IP phone based on the stored MAC address of the phone.

In step 304, the provisioning system requests the call control system to reset the IP phone. In step 306, the IP phone reboots and applies the new configuration. As a result, the full functionality required or appropriate for the IP phone is provided.

Thus, an approach for automated provisioning of IP phones in packet voice networks has been described. In one embodiment, the approach fully automates the IP phone provisioning process and thereby frees service providers or customers from sending a technician on site. The approach eliminates the need for a service provider to provide a phone preparation or staging center, and allows a manufacturing organization to ship phones directly to customers. Therefore, the approach provides cost savings for service providers and their customers.

In one embodiment, the approach allows for deployment scenarios in which the MAC address of the phone cannot be easily obtained. The approach simplifies phone distribution at the customer site and enables personnel to provide the right type of phone to each user based on a packing label on a shipping container for the phone, instead of based on matching a MAC address with a person who owns the phone. The approach reduces disruption of business by ensuring that the same phone numbers are retained when an enterprise migrates from a prior phone system to a VoIP phone system.

In one embodiment, a user can provide user identifier information that is used to identify and authenticate the user, and then associate the user with a particular temporary phone number, and thus a MAC address. The user identifier-MAC address association can then be used to automatically provision the phone. No involvement by a technician or system administrator is needed at any point of the process.

3.4 Deployment in a Cisco Network

As an example embodiment, the preceding general approaches and techniques may be applied in a network that uses Cisco equipment in the following way. Routers 16A, 16B may comprise, for example, the Cisco model 1760, 2611 xm, 2621 xm, 2651 xm, 2691, or 3725 routers. Switches 14A, 14B may comprise Cisco Catalyst 3550-24PWR switches, for example. IP phones 12A, 12B, 12N may comprise Cisco 7910, 7940, 7960, ATA 186, ATA 188, or 7905 IP phones. Other routers, switches and IP phones may be used in other embodiments. The routers, switches and IP phones in network 10 are assumed to be configured to provide packet telephony service with all appropriate support services that are conventionally used to deploy packet telephony. For example, LAN switching, IPsec, IOS(r) Telephony Service, etc., are deployed.

A network associated with the device manufacturer or the service provider is assumed to include a configuration deployment service, such as one or more Cisco CNS Configuration Engine servers. Such servers can automatically deliver configuration information to network elements based on master configurations or templates that are created and approved by the service provider.

The service provider may, but need not, provide external telephone service for the enterprise 11. The service provider (SP) is assumed not to use a staging area on its site, and therefore the Cisco equipment is shipped directly to the customer.

The customer then contacts the SP. The parties define the initial services and the terms of the contract, which may include a service level agreement, schedule, type of IP phone and LAN switch, financial aspects, lease terms, etc.

For each LAN switch, the SP determines the CNS Configuration Engine device to be used, by its hostname or IP address, and identifies the type of CNS identifier value that will be used to generate a switch configuration, and distribute configuration to the switch. The SP calls the manufacturer or uses its Web site and orders the switch and IP phones, specifies appropriate modules, bootstrap configurations, a hostname and network address for a CNS Configuration Engine server and CNS identifier type.

The manufacturer builds the requested devices. Upon shipment, CNS ID values for the switch and the IP phone are communicated to the SP, for example by scanning a bar code of the serial number on the device carton. In an alternative embodiment, the SP may pre-determine the CNS ID values and communicate them to the manufacturer before the devices are built, for use in creating the bootstrap configuration. Further, the CNS Configuration Engine can deliver a configuration for the switch, and an initial configuration for the phones may be provided by the call control system. When Cisco Call Manager is the call control system, then its graphical administration interface may be used to provide the phone configuration. When Cisco Call Manager Express is the call control system, then the CNS Configuration Engine can deliver initial configurations for the phones.

The SP then generates an appropriate initial configuration, including definitions of potential initial services, to be stored on the CNS Configuration Engine, and incremental configurations for enabling initial services when the IP phone begins operating. SP staff also prepares an initial configuration for the switch and finalizes the process in which it enables domain manager and CNS Configuration Engine for the specific platforms. For example, the SP staff may create device images, associate the initial configuration files and CNS IDs, and potentially associate following update steps for following service requests.

The manufacturer then ships the IP phone and switch. Once the customer receives the devices, the customer optionally may call an SP technician to come on site and assist with installation of the IP phone and switch. Alternatively, the customer performs the installation.

The IP phone obtains its IP connectivity through an IP address discovery protocol such as DHCP. The IP phone and switch then can attempt to contact the CNS Configuration Engine that is specified in their bootstrap configurations. If successful, the IP phone and switch retrieve their initial configurations from the call control system, such as Cisco Call Manager or Call Manger Express, and apply them. The devices then send an event specifying whether configuration success or failure occurred, for example, using the CNS agent.

Upon receiving a success event, the network operations center of the SP automatically or through human intervention sends additional configuration information to the switch or IP phone. Such additional configuration information may include service requests, adjustments, additional services, etc. The preceding processes are then used to discover the network address of the IP phone, determine a user who is associated with the IP phone, and deliver a final configuration to the IP phone.

4.0 Implementation Mechanisms—Hardware Overview

Figure 4:
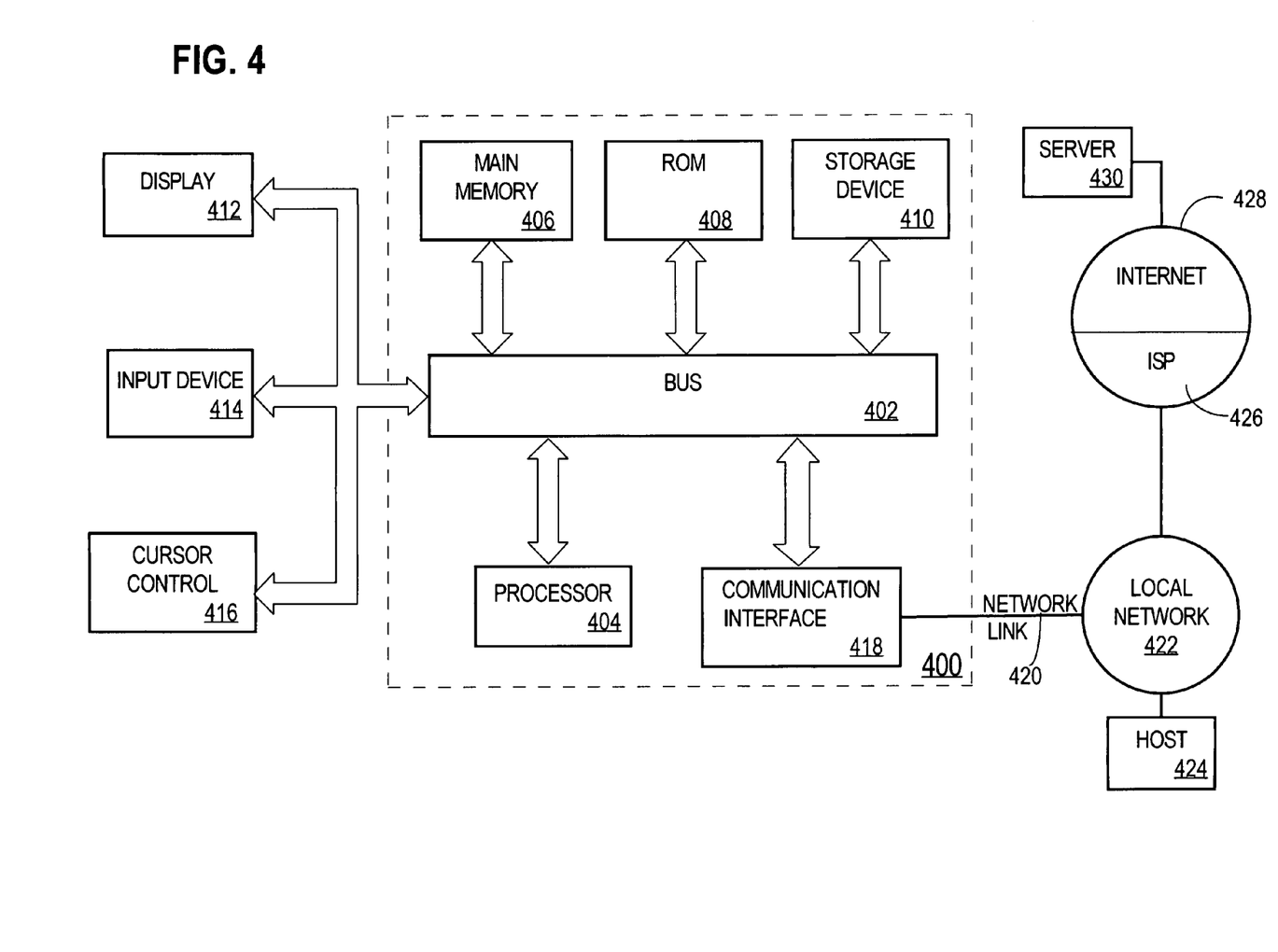
FIG. 4 is a block diagram that illustrates a computer system upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for automated provisioning of phones in packet voice networks. According to one embodiment of the invention, automated provisioning of phones in packet voice networks is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for automated provisioning of phones in packet voice networks as described herein.

Processor 404 may execute the received code as it is received, and/or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising the computer-implemented steps of:
   determining that an Internet Protocol (IP) phone has registered in a network;
   receiving a unique identifier of the IP phone;
   receiving a voice sample from an individual user, wherein the individual user is to be associated with the IP phone;
   determining an identity of the individual user based on said voice sample;
   retrieving, based on the user identity, a phone number, feature set for the IP phone, and other configuration parameters associated with the individual user;
   generating a configuration for the IP phone based on the user identity;
   wherein generating the configuration comprises selecting a stored basic configuration for the IP phone based on the unique identifier of the IP phone and a user identifier, assigning the phone number, and assigning the feature set that is for the IP phone, to result in generating a final configuration that is specific to the IP phone;
   providing the final configuration to the IP phone;
   wherein providing the final configuration includes delivering the final configuration to the IP phone, rebooting the IP phone, and applying the final configuration to the IP phone;
   wherein the method is performed by one or more computing devices.

2. A method as recited in claim 1, wherein the step of determining the identity of the individual user based on said voice sample further comprises the steps of:
   receiving user identification information from a voice recognition system;
   authenticating the user identification information; and
   determining the user identifier from the user identification information.

3. A method as recited in claim 1, wherein the step of determining that an IP phone has registered in the network comprises the steps of requesting a call controller in the network to provide information about all IP phones that are known to the call controller, and wherein the step of receiving a unique identifier of the IP phone comprises receiving, from the call controller, a MAC address of each IP phone that is known to the call controller.

4. A method as recited in claim 1, further comprising the step of provisioning a call controller in the network with the final configuration.

5. A method as recited in claim 1, further comprising the steps of registering the IP phone at a call control system with a minimum configuration and a temporary number that is assigned from a pool of available numbers.

6. The method of claim 1, wherein the step of determining an identity of the individual user is based on the phone number used to call a call control center.

7. The method of claim 1, further comprising instructing the user how to associate the users identity with the IP phone, wherein instructions are delivered to the user in a voice mail message.

8. The method of claim 1, further comprising directing all calls from an uninitialized IP phone to a call control center, wherein an uninitialized IP phone is not yet associated with the user; and prompting the user to provide user identification information.

9. A method comprising the computer-implemented steps of:
   determining that an IP phone has registered in a network;
   assigning a unique temporary phone number to the IF phone;
   receiving a media access control (MAC) address of the IP phone;
   receiving a voice sample from an individual user, wherein the individual user is to be associated with the IP phone;
   determining an identity of the individual user based on said voice sample;
   retrieving, from a database of user information, a user record based on the user identity;
   obtaining a user phone number from the user record;
   obtaining, from the user record, a feature set for the IP phone, and other configuration parameters associated with the individual user;
   generating a configuration for the IP phone based on the user identity;
   wherein generating the configuration comprises selecting a stored basic configuration for the IP phone based on the media access control (MAC) address of the IP phone and a user identifier, assigning the user phone number, and assigning the feature set that is for the IP phone, to result in generating a final configuration that is specific to the IP phone;
   providing the final configuration to the IP phone;
   wherein providing the final configuration includes delivering the final configuration to the IP phone, rebooting the IP phone, and applying the final configuration to the IP phone;
   wherein the method is performed by one or more computing devices.

10. A computer-readable volatile or non-volatile medium storing one or more sequences of instructions which, when executed by one or more processors, cause the one or more processors to perform the steps of:
    determining that an Internet Protocol (IP) phone has registered in a network;
    receiving a unique identifier of the IP phone;
    receiving a voice sample from an individual user, wherein the individual user is to be associated with the IP phone;
    determining an identity of the individual user based on said voice sample;
    retrieving, based on the user identity, a phone number, feature set for the IP phone, and other configuration parameters associated with the individual user;
    generating a configuration for the IP phone based on the user identity;
    wherein generating the configuration comprises selecting a stored basic configuration for the IP phone based on the unique identifier of the IP phone and a user identifier, assigning the phone number, and assigning the feature set that is for the IP phone, to result in generating a final configuration that is specific to the IP phone; and providing the final configuration to the IP phone;
wherein the instructions that cause providing the final configuration include instructions that cause delivering the final configuration to the IP phone, rebooting the IP phone, and applying the final configuration to the IP phone.

11. The computer-readable volatile or non-volatile medium of claim 10, wherein the instructions that cause determining the identity of the individual user based on said voice sample further comprise instructions which, when executed, cause:
receiving user identification information from a voice recognition system;
authenticating the user identification information; and
determining the user identifier from the user identification information.

12. The computer-readable volatile or non-volatile medium of claim 10,
wherein the instructions that cause determining that an IP phone has registered in a network, further comprise instructions which, when executed, cause requesting a call controller in the network to provide information about all IP phones that are known to the call controller, and
wherein the instructions that cause receiving a unique identifier of the IP phone, further comprise instructions which, when executed, cause receiving, from the call controller, a MAC address of each IP phone that is known to the call controller.

13. The computer-readable volatile or non-volatile medium of claim 10, further comprising instructions which when executed cause provisioning a call controller in the network with the final configuration.

14. The computer-readable volatile or non-volatile medium of claim 10, further comprising instructions which when executed cause registering the IP phone at a call control system with a minimum configuration and a temporary number that is assigned from a pool of available numbers.

15. A computer-readable volatile or non-volatile medium storing one or more sequences of instructions which, when executed by one or more processors, cause the one or more processors to perform the steps of:
determining that an IP phone has registered in a network;
assigning a unique temporary phone number to the IP phone;
receiving a media access control (MAC) address of the IP phone;
receiving a voice sample from an individual user, wherein the individual user is to be associated with the IP phone;
determining an identity of the individual user based on said voice sample;
retrieving, from a database of user information, a user record based on the user identity;
obtaining a user phone number from the user record;
obtaining, from the user record, a feature set for the IP phone, and other configuration parameters associated with the individual user;
generating a configuration for the IP phone based on the user identity;
wherein generating the configuration comprises selecting a stored basic configuration for the IP phone based on the media access control (MAC) address of the IP phone and a user identifier, assigning the user phone number, and assigning the feature set that is for the IP phone, to result in generating a final configuration that is specific to the IP phone;
providing the final configuration to the IP phone;
wherein the instructions that cause providing the final configuration include instructions that cause delivering the final configuration to the IP phone, rebooting the IP phone, and applying the final configuration to the IP phone.

* * * * *

UNITED STATES PATENT AND TRADEMARK OFFICE
CERTIFICATE OF CORRECTION

PATENT NO. : 8,144,692 B2  
APPLICATION NO. : 11/089281  
DATED : March 27, 2012  
INVENTOR(S) : Najeeb Farhan Haddad et al.

Page 1 of 1

It is certified that error appears in the above-identified patent and that said Letters Patent is hereby corrected as shown below:

In the claims:

Claim 9, Column 16, Line 15, replace "IF" with --IP--

Signed and Sealed this
Twenty-ninth Day of May, 2012

David J. Kappos
*Director of the United States Patent and Trademark Office*